Patented Aug. 12, 1941

2,252,131

UNITED STATES PATENT OFFICE 2,252,131

METHOD OF FINING GLASS AND BATCH THEREFOR

Aaron K. Lyle, West Hartford, Conn., assignor to Hartford-Empire Company, Hartford, Conn., a corporation of Delaware No Drawing. Application July 1, 1939, Serial No. 282,483

7 Claims. (Cl. 106—52)

This invention relates to a method of fining glass to produce a clear, colorless, transparent glass, and also to a batch composition for making such a glass, and more particularly to a batch composition containing tellurium as a fining agent.

Considerable difficulty is encountered from time to time in properly fining glass, i. e., freeing it from gases. Many different materials have been used as batch ingredients to assist in the fining. The group of elements of the sixth periodic group, i. e., sulfur, selenium and tellurium, have been suggested for use as fining agents. The present invention is based, however, upon a discovery that the previous teachings as to the relative effectiveness of these elements appear to be erroneous in that it is now found that selenium is a better fining agent than is sulfur, and tellurium is better than either. One theory tending to explain this is that all these elements have several valences. The tendency, however, to pass from a higher valence state to a lower valence state appears to increase from sulfur to tellurium. Tellurium in a compound wherein it has a valence of six appears to be an excellent oxidizing agent. In order to oxidize tellurium to this valence, in the event that it is put into a glass batch either in the elemental form or with some lower valence, it has been found desirable to add to the batch an oxidizing agent, such as nitre. It has also been found that certain materials, which are good oxidizing agents, also have desirable properties as fining agents for glass. In any event, it has been discovered that tellurium when added to a glass batch, either in the form of elemental tellurium or as a tellurium compound, serves to assist in the fining of the glass in a desirable manner. This is, therefore, a principal object of the present invention.

Further, in considering the elements, sulfur, selenium and tellurium, the prior art has largely neglected to use the latter two of these elements as fining agents for the reason that selenium and tellurium gave the glass a color and thus were not suitable for the making of clear, colorless, transparent glass.

A further basis of the present invention is the discovery that the use of the oxides of arsenic or antimony, in conjunction with selenium or tellurium, will prevent this discoloration. However, the amount of arsenic or antimony oxides which must be added to prevent the coloring of glass by selenium is excessive; so that the cost of such glass, using selenium as a fining agent, would be prohibitive from a commercial point of view. The amount of arsenic or antimony oxides which must be added when using tellurium is reasonable, while still preventing the discoloring of the glass.

A desirable batch composition which may serve as an example of batches made up in accordance with the present invention, but not as limiting it, is as follows:

| | |
|---|---|
| Sand | 1000 |
| Soda | 400 |
| Limestone | 250 |
| Nitre | 10 |
| Arsenous oxide | 2 |
| Tellurium | 2 |

The proportions given are by weight. The tellurium also may be added as elemental tellurium, or as any available compound thereof, the weight proportion given being of the tellurium per se.

A further discovery upon which the present invention is based is that an impure tellurium may be used when that impurity so introduced into the glass is of such character that it will not itself harm the glass. Selenium and tellurium are both found in the flue dust collected from smelting operations on certain copper ores and are recovered therefrom. The recovered material, however, contains both selenium and tellurium. Whenever these elements are desired in a pure state this selenium-tellurium mixture is further worked upon to separate the elements from each other. It is reasonable to suppose, therefore, that a mixture of selenium and tellurium derived from this source may well be cheaper than either pure selenium or pure tellurium. Inasmuch as selenium is desirable as a decolorizer for glass, and is widely used for this purpose, a mixture of selenium and tellurium prior to the separation of the elements can be used as a single ingredient in the batch for the double purpose of providing the tellurium as a fining agent, in accordance with the present invention, and providing the selenium of the mixture as a decolorizer. The use of such a mixed material as a single ingredient in the batch is a further feature of the present invention.

The invention also includes in its scope the method of making and fining glass by the use of tellurium, or a mixture of tellurium and selenium as above set forth.

While there is disclosed herein but a single example of a complete batch composition for making a soda-lime glass which is clear, transparent and colorless, it will be understood that the invention is not limited to the particular proportions given in this example, but that the proportions of the various ingredients and their nature may be varied as set forth hereinabove and in the appended claims, which are to be construed as broadly as the state of the prior art permits.

I claim:

1. A batch composition for a clear, colorless, transparent glass of the soda-lime type, comprising a material containing tellurium, and sufficient of a material selected from the group consisting of arsenic and antimony oxides to prevent the tellurium from discoloring the glass.

2. A batch composition for a clear, colorless, transparent glass of the soda-lime type, comprising an oxidizing agent, a fining agent containing tellurium, and sufficient of a material selected from the group consisting of the oxides of arsenic and antimony to prevent the tellurium from discoloring the resulting glass.

3. A batch for a clear, colorless, transparent glass of the soda-lime type, comprising the following ingredients in substantially the weight proportions given:

| | |
|---|---|
| Sand | 1000 |
| Soda | 400 |
| Limestone | 250 |
| Nitre | 10 |
| Arsenous oxide | 2 |
| Tellurium | 2 |

4. A batch for a clear, colorless, transparent glass, comprising, as ingredient materials for assisting in the fining of the glass, an oxidizing agent and a material containing tellurium, and a material to prevent the tellurium from discoloring the glass, the last named material being one selected from the group consisting of the oxides of arsenic and antimony.

5. A batch for a clear, colorless, transparent glass of the soda-lime type comprising, as a single ingredient, a material containing both tellurium and selenium, an oxidizing agent, and a material selected from the group consisting of the oxides of arsenic and antimony.

6. The method of fining a soda-lime glass to produce a clear, colorless, transparent glass, comprising adding to the batch a material containing tellurium, an oxidizing agent, and sufficient of a material selected from the group consisting of the oxides of arsenic and antimony to prevent the tellurium from coloring the glass.

7. The method of making a soda-lime glass to produce a clear, colorless, transparent glass, comprising adding to the batch a single ingredient containing both tellurium and selenium, and also adding nitre and a material selected from the group consisting of the oxides of arsenic and antimony.

AARON K. LYLE.